_United States Patent Office_

3,629,393
Patented Dec. 21, 1971

3,629,393
RELEASE-SUSTAINING-TABLET
Atsushi Nakamoto, Kawasaki-shi, and Keizabuto Ogwa and Tadashi Ukigaya, Tokyo, Japan, assignors to Nikken Chemical Co., Ltd., Tokyo, Japan
No Drawing. Filed Sept. 11, 1969, Ser. No. 857,222
Int. Cl. A61k 27/12
U.S. Cl. 424—22                8 Claims

ABSTRACT OF THE DISCLOSURE

Time-release tablets are provided by blending and compressing the following types of granules: (A) granules comprising a medically active ingredient, a hydrophobic salt of a fatty acid, and a non-toxic polymer compound which is insoluble in the digestive fluids, (B) granules comprising a water-swellable, high molecular weight compound and a pharmaceutical carrier, and, (C) granules comprising a pharmaceutical carrier and, if necessary, a medically active ingredient or a buffering agent.

BACKGROUND OF THE INVENTION

Field of invention

The present invention relates to a time-release tablet and more particularly to a release-sustaining tablet which is capable of continuously releasing a medically active ingredient into the body over a predetermined specific time period in order to maintain a specific concentration of the ingredient in the bloodstream. In addition, this invention relates to a time-release tablet which is capable of providing a buffering action over an extended specific time period.

Description of prior art

The demand for time-release medicaments which have prolonged time release effects has become increasingly well established. Several types of release sustaining medicaments are presently commercially avaliable, and these can be briefly classified according to the following groups: (a) release-sustaining granules or tablets in which the medically active ingredients are coated with a substance which is insoluble or sparingly soluble in the digestive fluids; for example, a wax or a synthetic resin, (b) release-sustaining medicaments in which the medically active ingredients are dispersed in or are admixed and pressed with a substance which is insoluble or sparingly soluble in the digestive fluids and, (c) release-sustaining medicaments in which the medically active ingredients are combined with an ion-exchange resin.

Each of these commercially available techniques for providing time-release medicaments, however, have several disadvantages. Coating the active ingredients, as is required in type (a) medicaments, require a great deal of skill and experience and require a significant amount of time for their preparation, since the usual coating process requires that repeated coatings be performed to build up the desired thickness of film. Dispersing the active ingredient with the insoluble or sparingly soluble substance, as is required in type (b) medicaments, requires a disproportionately large amount of insoluble or sparingly soluble substances which restricts the content of the main active ingredients. Moreover, part of the active ingredients contained within the tablet may be excreted before it is released into the body. With regard to type (c) release-sustaining medicaments, only certain medically active ingredients are compatible with the ion-exchange resins and even for those medically active ingredients which can be compounded successfully with the ion-exchange resins, the speed of medicament released is frequently determined by pH. Accordingly, the speed of release is undesirably variable from one individual to the next.

SUMMARY OF THE INVENTION

Accordingly, one object of the present invention is to provide a novel time release-sustaining medicament which is effective for continuously releasing a medically active ingredient at a uniform rate of speed.

Another object of this invention is to provide a novel time release-sustaining medicament which is capable of providing a buffering action over the release period.

Another object of the present invention is to provide a process for producing the novel time release-sustaining medicament.

These and other objects have now herein been attained by blending and compressing each of the following three types of granules: (A) granules comprising a medically active ingredient, a hydrophobic salt of a fatty acid, and a non-toxic polymer compound which is insoluble in the digestive fluids, (B) granules comprising a water-swellable, high molecular weight compound and a pharmaceutical carrier, and, (C) granules comprising a pharmaceutical carrier, and, if necessary, a medically active ingredient or a buffering agent.

DETAILED DESCRIPTION OF THE PREFERRED EMBODIMENTS

The present invention can be used for preparing a wide variety of time-release medicines, including those wherein the active ingredient is penicillin, ethylphenylephrintheophylline, hydrocortisone, nicotinamide, butylbiguanide, and especially those compounds which are absorbed into the stomach and decomposed by gastric acids, such as penicillin G.

In order to prepare the release-sustaining medicaments of the present invention, it is necessary to prepare each of the three types of granules separately and then to blend them according to the required proportions and shape them by pressing into tablet form. If all of the ingredients are blended and compounded into a single granule and shaped by compression, it is difficult to obtain a suitable time-release-sustaining medicine. What is surprising about the present invention is that by compounding granules (C) with granules (A) and (B), an especially suitable rate of active ingredient release is obtainable and the medically active ingredient is completely released. This is all the more surprising, since granules (C) are composed of materials which are easily dissolvable with water, such as calcium carbonate, or starch materials which are normally considered to be undesirable in time-release medicaments.

In the present invention, the rate of release of the medically active ingredients can be controlled by the proper selection of the composition in granules (A) and/or (B). The velocity is limited principally by the relative proportions between the hydrophobic salt of fatty acid and the quantity of the medically active ingredients. The ratio of the hydrophobic fatty acids to the medically active ingredients can be varied over the wide range of 0.2 to 1 to 10 to 1. In general, the higher the ratio of the hydrophobic salt of fatty acid to the medically active ingredients, the slower the velocity of release of the medically active ingredient.

The ratio of the insoluble polymer compound contained in granule (A) affects the granule strength and accordingly, it affects to some extent, at least, the velocity of the release of the medically active ingredient. The polymer compound also acts as a binder for granule (A) and accordingly, its quantity may be restricted to at least 5 weight percent depending upon the quantity of granule (A). If the quantity of polymer compound in granule (A) is too high, however, the preparation of the granule becomes increasingly more difficult. For good results, the quantity of the polymer should not exceed 15 weight percent.

The relation of the speed of release to the ratio of the active ingredient and the higher fatty acid salt and granule (A) is shown in Table 1. In this example, potassium penicillin G is used as the higher fatty acid salt and polyvinyl acetate is used as the polymer. Granule (B) contains 10 parts of calcium carbonate, 7.5 parts of starch, and 2.5 parts of hydroxyl propyl cellulose. Granule (C) contains 1 part of lactose and 2.5 parts of starch. The granules were blended in the ratio A to B to C of 2:1:1 and were compressed into tablets weighing 600 milligrams each.

TABLE 1

| Proportions in Granule (A) | | | Amount of penicillin released (percent) in— | | | | |
|---|---|---|---|---|---|---|---|
| Magnesium stearate | Potassium penicillin-G | Polyvinyl acetate | 1 hr. | 2 hrs. | 3 hrs. | 5 hrs. | 10 hrs. |
| 7 | 2 | 1 | 23.7 | 30.8 | 53.3 | 67.2 | 87.9 |
| 4 | 5 | 1 | 29.6 | 50.2 | 61.6 | 77.5 | 100 |
| 2 | 7 | 1 | 42.0 | 62.8 | 76.0 | 90.7 | 100 |

The release speed can also be controlled by using a water-swellable high molecular weight material such as hydroxy propyl cellulose as is used in granule (B). Good results are obtainable when the quantity of water-swellable material used is between 0.5 and 30 weight percent. The speed of medicament released can be decreased by increasing the quantity of water-swellable high molecular weight material content. The water-swellable material, however, should not be used in amounts of more than 30 weight percent, since it becomes difficult to produce the (B) granules.

The effect on the speed of release to the content of the high molecular weight material in granule (B) is shown in Table 2.

In this example, granule (A) contains 4 parts of magnesium stearate, 5 parts of potassium penicillin G, and 1 part of polyvinyl acetate. Granule (B) contains 1 part of lactose and 2.3 parts of starch. The granules were blended in the ratio of A to B to C of 2:1:1 and were compressed into tablets weighing 600 mg. each.

TABLE 2

| Proportions in Granule (B) | | | Amounts of penicillin released (percent wt.) in— | | | | |
|---|---|---|---|---|---|---|---|
| Calcium carbonate | Starch | Hydroxypropyl cellulose | 1 hr. | 2 hrs. | 3 hrs. | 5 hrs. | 10 hrs. |
| 10 | 9.5 | 0.5 | 37.3 | 59.5 | 71.7 | 91.5 | 100 |
| 10 | 8.0 | 2.0 | 30.3 | 49.7 | 64.8 | 83.3 | 100 |
| 10 | 7.0 | 3.0 | 25.8 | 43.0 | 55.6 | 74.3 | 93.9 |
| 10 | 5.0 | 5.0 | 22.2 | 36.2 | 45.5 | 58.4 | 75.9 |

According to this invention, the release speed can be widely controlled by adjusting the composition of granules (A) and (B). For example, if large amounts of medically active ingredient is required in each tablet, the quantity of the higher fatty acid salt must be decreased, since the size of the tablet is limited. Since the fatty acid salt acts to control the release speed, however, it would be difficult to obtain a satisfactory speed were it not for the presence of the (B) granules. It is possible by proper formulation of the granules (B) to provide complete release speed control.

Table 3 shows the degree of control obtainable by adjusting the proportions of the components of granules (A) and (B). In these examples, granule (C) contains 1 part of lactose and 2.3 parts of starch. The granules were blended in the ratio of A to B to C of 2:1:1, and were compressed into tablets weighing 600 mg. each.

TABLE 3

| Proportion in Granule (A) | | | Proportion in Granule (B) | | | Amount of penicillin released (percent) in— | | | | | |
|---|---|---|---|---|---|---|---|---|---|---|---|
| Magnesium stearate | Potassium penicillin-G | Polyvinyl acetate | Calcium carbonate | Starch | Hydroxypropyl cellulose | 1 hr. | 2 hrs. | 3 hrs. | 4 hrs. | 5 hrs. | 10 hrs. |
| 2 | 7 | 1 | 10 | 9.5 | 0.5 | 48.5 | 71.3 | 85.2 | 94.1 | 100 | |
| 2 | 7 | 1 | 10 | 5.0 | 5.0 | 22.6 | 38.3 | 50.0 | 57.2 | 63.4 | 81.0 |
| 4 | 5 | 1 | 10 | 7.0 | 3.0 | 25.2 | 42.9 | 56.1 | 65.9 | 73.4 | 93.3 |
| 9 | 2 | 1 | 10 | 5.0 | 5.0 | 14.8 | 26.7 | 36.0 | 42.5 | 47.3 | 62.0 |

The higher fatty acid salt used in granule (A) is preferably a salt of stearic acid, palmitic acid, aleic acid, or the like. Applicable metals for formation of the above salt include magnesium, calcium, aluminum. Suitable polymers which are insoluble in the digestive fluids include the vinyl polymers, such as polyvinyl acetate, polyvinyl pyrrolidone; the methacrylic resins, such as polymethyl methacrylate; and the cellulose derivatives, such as cellulose acetate-phthalate.

The high molecular weight water-swellable compound used in granule (B) is preferably hydroxy propyl cellulose, hydroxy-propyl-methyl-cellulose, sodium carboxymethyl-cellulose, gum arabic, sodium alginate, or the like.

Any pharmaceutical carrier which is easily disintegratable may be used in granule (C) to provide release control or buffering. Suitable carriers include starch, lactose, calcium carbonate, calcium phosphate, sugar, glucose and the like.

Good results are obtainable when the ratio of granules (A), granules (B) and granules (C) is between 2 to (0.5 to 2) to (0.5 to 2). Where the proportions of granules (A) or granules (B) is increased, the speed of release becomes too slow. On the other hand, where the ratio of granules (C) is increased, the speed of release becomes too fast. The ratio of said three types of granules should be selected depending upon the required period of release time. The tablet of present invention should be shaped by compression so as to have a hardness of 0.5 to 7 kg.

Although the hardness limitation is not critical, tablets having lower hardness are too readily disintegratable by movement of the digestive organs. On the other hand, tablets having a higher hardness have too great a tendency to break into particles by contact with the digestive fluids, thereby nullifying the release-sustaining effects.

The time-release speed of the medically active ingredients in the release-sustaining tablet of the present invention is almost constant so long as the hardness of the tablet is within the aforementioned range.

In preparing the release-sustaining tablet of this invention, it is desirable to use a quantity of medicament such that the quantity of the medicament is one-fifth to ten times the quantity of the higher fatty acid salt. The salt and medicament can be compounded in a suitable mill or blender.

The polymer may be dissolved in an organic solvent such as ethanol or trichloroethane and is blended with the mixture. The blended mixture is then passed through a suitable granulator and dried to provide the granules (A).

Granules (B) and (C) are prepared according to conventional techniques (for example, the method described in Japanese Pharmacopeia). Granule (B) contains water-swellable, high molecular weight material and, if necessary, a pharmaceutical carrier. Granule (C) contains a pharmaceutical carrier optionally with a buffering agent.

The three types of granules obtained have been blended and compressed into a tablet form and, if necessary, additional lubricants may be added in the amounts of about 0.5 weight percent of the total weight of the blend.

The granulation and tableting operations required in this invention are performed in the conventional apparatus by known techniques.

The rate of change of the speed of time release of the medically active ingredients which is caused by fluctuations in the process, size of granules, preparation, or hardness of tablet, is low and accordingly reproducability of the releasing speed is excellent and suitable for mass production.

The time release tablets of this invention are particularly applicable for oral administration to warm blooded mammals and especially human beings.

Without limiting the present invention, the following examples are presented for purposes of illustration only, and are not to be construed as limiting in any manner. All parts are by weight, unless otherwise specified.

EXAMPLE 1

150 grams of potassium penicillin G were mixed with 120 grams of magnesium stearate, 100 grams of 30 weight percent solution of polyvinyl acetate in trichloroethane, were added to the mixture and kneaded and passed through JIS 20 mesh sieves. After drying 40–50° centigrade, the mixture was granulated into particles having a size range of 18–24 meshes.

Meanwhile, 75 grams of calcium carbonate, 60 grams of starch, and 15 grams of hydroxy propyl cellulose were mixed and kneaded after addition of trichloroethane and granulated with a JIS 20 mesh sieve in a manner similar to the above-described procedure.

The granules produced were mixed in a proportion of 30 grams of granule (A), 14.7 grams of granule (B), and 15 grams of granule (C), 0.3 gram of magnesium stearate was added as a lubricant. The mixture was compressed into tablets having a weight of 0.6 gram each. Each tablet produced contains 150 mg. of penicillin (G-potassium).

The results of the time releasing tests conducted at 37.5° C. for the above tablets are shown in the table below. Artificial digestive fluids having a pH of 1.2 was employed for the initial first hour, whereas digestive fluids having a pH of 6.0 was employed for subsequent hours in the test.

TABLE 4

| Time passed (hrs.): | Amount of ingredient released, percent |
|---|---|
| 1 | 26.0 |
| 2 | 47.6 |
| 4 | 69.8 |
| 6 | 85.5 |
| 8 | 94.6 |
| 10 | 100 |

EXAMPLE 2

Granules were prepared separately in exactly the same manner as described above. 150 g. of pencillin G-potassium were mixed with 130 grams of magnesium stearate, 100 grams of 20 weight percent cellulose acetate phthalate. A mixed solvent consisting of equal amounts of acetone and ethanol were added to the mixture, kneaded subsequently and passed through a JIS 20 mesh sieve. The mixture was then 40–50° centigrade and granulated into granules having a particle size ranging from 18–24 mesh.

75 grams of calcium carbonate, 55 grams of starch, and 20 grams of gum arabic were separately mixed and added with trichloroethane. The mixture was then kneaded and granulated with a JIS 20 mesh sieve.

105 grams of calcium carbonate, 45 grams of starch were admixed. 3 weight percent starch solution was added to the reaction and kneaded, and then granulated with a JIS 20 mesh sieve.

30 grams of granule (A), 14.7 grams of granule (B), 15 grams of granule (C), and 0.3 gram of magnesium stearate as lubricant were blended and compressed into tablets each weighing 0.6 gram and containing 150 mg. per tablet of penicillin in G-potassium as the medicant ingredient. The tablets produced were subjected to the time-release test. The results are shown in the following table.

TABLE 5

| Time passed (hrs.): | Amount of ingredient released, percent |
|---|---|
| 1 | 15.2 |
| 2 | 34.0 |
| 4 | 62.5 |
| 6 | 80.0 |
| 8 | 90.7 |
| 10 | 100 |

EXAMPLE 3

100 grams of butyl biguanide-hydrochloride and 180 grams of magnesium stearate were mixed. 100 grams of 20 weight percent of polymethylmethacrylate in methyl-ethyl-ketone was added to the mixture and passed through JIS 20 mesh sieve. The mixture was then dried at 40 to 50° centigrade and granulated to produce JIS 18–24 mesh of granules. Separately, 112.5 grams of calcium carbonate, 90 grams of starch, and 22.5 grams of hydroxy-propylcellulose were mixed. Trichloroethane was added to the mixture and was then granulated with a JIS 20 mesh sieve. Separately, 52.5 grams of calcium carbonate and 22.5 grams of starch were mixed. 30% of starch in an aqueous starch solution was added to the mixture, and was granulated with a JIS 20 mesh sieve.

10 grams of granule (A), 7.4 grams of granule (B), 2.5 grams of granule (C), and 0.1 gram of magnesium stearate as lubricant, were blended and then compressed into tablets each weighing 0.6 gram. The tablets each contained 100 mg. of butyl biguanide, hydrochloride.

The results of the time-release tests in accordance with the methods stated in Example 1 is as follows:

TABLE 6

| Time passed (hrs.): | Amounts of medical ingredients released, wt. percent |
|---|---|
| 1 | 17.1 |
| 2 | 47.6 |
| 4 | 71.5 |
| 6 | 84.2 |
| 8 | 95.1 |
| 10 | 100 |

EXAMPLE 4

150 grams of nicotinamide and 120 grams of magnesium stearate were mixed. 100 grams of 3 weight percent of polyvinylpyrrolidone in trichloroethane were added to the mixture, kneaded, and passed through a JIS 20 mesh sieve.

The product was granulated with a JIS 18–20 mesh sieve, after drying at 40–50° centigrade.

Separately, 75 grams of calcium carbonate, 60 grams of starch, and 15 grams of hydroxy propylcellulose were mixed. Trichloroethane was added to the mixture and then granulated with a JIS mesh screen.

Separately, 105 grams of calcium carbonate and 45 grams of starch were mixed. 3 weight percent of starch in an aqueous starch solution were added to the mixture, kneaded and granulated with a JIS 20 mesh sieve. 30 grams of magnesium stearate as lubricant were blended and compressed into tablets having each 0.6 gram of weight. Each tablet contains 150 milligrams of nicotinamide as a medical ingredient. The results of the time-release test in accordance with the method stated in Example 1 are as follows:

| Time passed (hrs.): | Amounts of medical ingredients released, wt. percent |
|---|---|
| 1 | 30.5 |
| 2 | 54.2 |
| 4 | 79.4 |
| 6 | 88.7 |
| 8 | 94.1 |
| 10 | 100 |

It should be clearly understood that many modifications and changes can be made without departing from the spirit and scope of the present invention.

What is claimed and intended to be covered by Letters Patent is:

1. A time-release tablet consisting essentially of:
   (A) granules containing a medically active ingredient, which is otherwise absorbed into the stomach and decomposed by gastric acids, a hydrophobic magnesium, calcium or aluminum salt of a higher fatty acid and as a non-toxic organic solvent soluble polymer which is insoluble in the digestive fluids, a member selected from the group consisting of polyvinyl acetate, cellulose acetate phthalate, polymethylmethacrylate and polyvinylpyrrolidone, wherein the ratio of said hydrophobic fatty acid salt to said medically active ingredient is within the range of 0.2–10 to 1 and wherein the content of said polymer compound is within 5 to 15 percent by weight of the total weight of the granules (A),
   (B) medication-free swellable granules containing a water swellable, high molecular weight compound selected from the group consisting of hydroxypropylcellulose, hydroxypropylmethylcellulose, sodium carboxymethylcellulose, gum arabic, sodium alginate, and a readily water-dissolvable pharmaceutical carrier, and wherein the content of said high molecular weight compound is within the range of 0.5 to 30 weight percent of the total weight of granules (B), and,
   (C) medication-free granules containing an easily disintegratable pharmaceutical carrier selected from the group consisting of starch, lactose, calcium carbonate, calcium phosphate, sugar and glucose, wherein the ratio of (A), (B) and (C) is 2:(0.5 to 2):(0.5 to 2), said tablets being shaped by compression to have a hardness of 0.5 to 7 kg., to thereby provide an almost constant time-release speed of the medically active ingredient, wherein the velocity of the rate of release of the medically active ingredient can be slowed by increasing the ratio of the hydrophobic salt of the higher fatty acid and/or by increasing the proportions of (A) to granules (B) and wherein the velocity of the rate of release can be increased by increasing the ratio of granules (C).

2. The time-release tablet of claim 1, wherein said hydrophobic salt of fatty acid is magnesium stearate, said non-toxic polymer compound is polyvinyl acetate, said water-swellable, high molecular weight compound is hydroxy-propylcellulose.

3. The time-release tablet of claim 1, wherein said hydrophobic salt of a fatty acid is magnesium stearate, said non-toxic polymer is cellulose acetate phthalate and said water-swellable, high molecular weight compound is gum arabic.

4. The time-release tablet of claim 1, wherein said hydrophobic salt of a fatty acid is magnesium stearate, said non-toxic polymer is polymethylmethacrylate and said water-swellable, high molecular weight compound is hydroxy-propylcellulose.

5. The time-release tablet of claim 1, wherein said hydrophobic salt of a fatty acid is magnesium stearate, said non-toxic polymer is polyvinyl pyrrolidone, and said water-swellable, high molecular weight compound is hydroxypropylcellulose.

6. The time-release tablets of claim 1 wherein said medically active ingredient is selected from the group consisting of penicillin, ethylphenylephrintheophylline, hydrocortisone, nicotinamide and butylbiguanide.

7. The time-release tablet of claim 1 wherein the pharmaceutical carrier used in granules (B) is calcium carbonate and starch.

8. A buffered time-release tablet capable of providing a buffering action over the release period consisting essentially of:
   (A) granules containing a medically active ingredient which is otherwise absorbed into the stomach and decomposed by gastric acids, a hydrophobic magnesium, calcium or aluminum salt of a higher fatty acid, and as a non-toxic organic solvent-soluble polymer a member selected from the group consisting of polyvinyl acetate, cellulose acetate phthalate, polymethylmethacrylate and polyvinylpyrrolidone, wherein the ratio of said hydrophobic fatty acid salt to said medically active ingredient is within the range of 0.2–10 to 1 and wherein the content of said polymer compound is within 5 to 15 percent by weight of the total weight of granules (A).
   (B) medication free swellable granules containing a water-swellable, high molecular weight compound selected from the group consisting of hydroxypropylcellulose, hydroxypropyl methylcellulose, sodium carboxymethylcellulose, gum arabic, sodium alginate, and a readily water dissolvable pharmaceutical carrier, and wherein the content of said high molecular weight compound is within the range of 0.5 to 30 weight percent of the total weight of granules (B), and,
   (C) medication free buffering granules containing an easily disintegratable pharmaceutical carrier selected from the group consisting of starch, lactose, calcium carbonate, calcium phosphate, sugar and glucose.

References Cited

UNITED STATES PATENTS

| 3,062,720 | 11/1962 | Costello | 424—22 |
| 3,101,293 | 8/1963 | Gaunt et al. | 424—22 |
| 3,102,845 | 9/1963 | Fennell | 424—22 |
| 3,133,863 | 5/1964 | Tansey | 424—22 X |
| 3,136,695 | 6/1964 | Tansey | 424—22 |
| 3,148,124 | 9/1964 | Gaunt | 424—22 |
| 3,322,633 | 5/1967 | Simoons | 424—19 |
| 3,362,881 | 1/1968 | Eberhardt et al. | 424—22 X |

SHEP K. ROSE, Primary Examiner

U.S. Cl. X.R.

424—19